US007293425B2

(12) United States Patent
Tamura et al.

(10) Patent No.: US 7,293,425 B2
(45) Date of Patent: Nov. 13, 2007

(54) THERMO SIPHON CHILLER REFRIGERATOR FOR USE IN COLD DISTRICT

(75) Inventors: Yoshihisa Tamura, Tokyo (JP); Masataka Koyatsu, Tokyo (JP); Akito Machida, Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 183 days.

(21) Appl. No.: 10/514,110

(22) PCT Filed: May 13, 2003

(86) PCT No.: PCT/JP03/05935

§ 371 (c)(1), (2), (4) Date: Jul. 27, 2005

(87) PCT Pub. No.: WO03/095906

PCT Pub. Date: Nov. 20, 2003

(65) Prior Publication Data

US 2005/0284169 A1 Dec. 29, 2005

(30) Foreign Application Priority Data

May 13, 2002 (JP) ............................ 2002-137511

(51) Int. Cl.
*F25B 13/00* (2006.01)
*F25D 17/02* (2006.01)

(52) U.S. Cl. ........................................ 62/324.1; 62/434

(58) Field of Classification Search ............... 62/324.1, 62/225, 228.3, 434, 196.3, 50, 238.6, 513
See application file for complete search history.

(56) References Cited

U.S. PATENT DOCUMENTS 2,930,204 A * 3/1960 Lang ........................... 62/148
3,156,101 A * 11/1964 McGuffey .................... 62/223
4,340,030 A * 7/1982 Molivadas .................. 126/635
4,377,938 A * 3/1983 Crespin et al. ............... 62/434
4,441,902 A * 4/1984 Jardine ...................... 62/238.6
4,485,639 A * 12/1984 Sakamoto .................... 62/505
4,843,828 A * 7/1989 Gladman ..................... 62/647
5,161,382 A * 11/1992 Missimer .................... 62/46.1

(Continued)

FOREIGN PATENT DOCUMENTS

EP 0 937 950 A2 8/1999

(Continued)

*Primary Examiner*—Mohammad M. Ali
(74) *Attorney, Agent, or Firm*—Crowell & Moring LLP

(57) ABSTRACT

In order to provide a thermo-siphon chiller refrigerator for use in cold districts which performs natural refrigerant-circulation refrigerating cycle and also can perform a forced refrigerant-circulation refrigerating cycle when outside air temperature is high by using an indoor heat exchanger, an outdoor heat exchanger, and a compressor, and combining them with refrigerant piping, the thermo-siphon chiller refrigerator for use in cold districts of the invention has a compressor (10) additionally installed to a natural refrigerant-circulation refrigerating system comprising an outdoor heat exchanger (12), an indoor heat exchanger (11) located at a position lower than that of the outer heat exchanger (12), and an expansion valve (18). When the refrigerating capacity of the natural refrigerant-circulation refrigerating system is not sufficient, the additional compressor (10) is operated to perform a forced refrigerant-circulation cycle i.e. a vapor compression refrigerating cycle.

4 Claims, 3 Drawing Sheets

U.S. PATENT DOCUMENTS 5,331,824 A * 7/1994 Miller et al. .................. 62/175
6,023,935 A 2/2000 Okazaki et al.

FOREIGN PATENT DOCUMENTS

GB 2 233 080 A 1/1991
JP 55-29394 7/1980
JP 58198653 11/1983
JP 1-285745 A 11/1989
JP 1285745 11/1989
JP 10-111030 4/1998
JP 2000-46423 2/2000
JP 2001-99446 A * 4/2001

* cited by examiner

THERMO SIPHON CHILLER REFRIGERATOR FOR USE IN COLD DISTRICT

FIELD OF THE INVENTION

The present invention relates to an energy-saving thermo-siphon chiller refrigerator which can perform a vapor compression refrigerating cycle (forced circulation cycle of refrigerant) in summer as a backup refrigerating cycle of the thermo-siphon chilling cycle (natural circulation cycle of refrigerant).

TECHNICAL BACKGROUND

Large scale buildings in cold districts may need cooling even in the condition the atmosphere is cold in winter, particularly in a data center, etc. where a large amount of heat is generated by communication service equipment. Therefore, generally, room coolers are operated there even in winter.

The air conditioning system generally used for air conditioning of a building is composed of, as shown in FIG. 2, an outdoor heat exchanger 102 functioning as a condenser, a receiver 108, an indoor heat exchanger 101 functioning as an evaporator, a compressor 110, and an expansion valve 104. The system performs a vapor compression refrigerating cycle which is an energy consuming refrigerating cycle.

However, in a cold district where the atmospheric temperature is low in winter, a natural refrigerant-circulation system is used as an energy-saving air conditioning system.

Said natural refrigerant-circulation system utilizes the phase-change of the refrigerant to effect natural circulation of the refrigerant based on the thermo-siphon principle caused by the effect of temperature difference of the refrigerant. By the system, energy saving and reduction of running cost are achieved.

Among a variety of natural refrigerant-circulation system proposed in the past, a system proposed recently will be explained hereunder with reference to drawings.

Said proposal is disclosed in Japanese Laid-Open Patent Application No.10-300128 as “Natural refrigerant-circulation chilling and dehumidifying apparatus and air-conditioning system combined with the apparatus”. The proposal relates to air-conditioning or dehumidification or indirect air conditioning utilizing outside cold air of a house or office building, and was made to solve the problems that a conventional air-conditioning apparatus which works on a vapor compression refrigerating cycle consumes a large amount of energy and enhances environmental pollution. There are disclosed a first, second, and third embodiment in the proposal.

The first embodiment of said proposal is, as shown in FIG. 3, composed of an indoor heat exchanger 101, an outdoor heat exchanger 102, and a refrigerant piping 103. The indoor heat exchanger 101 is provided in a room for exchanging heat with the air in the room. The outdoor heat exchanger 102 is provided in the outside of the separating wall A for changing heat with the outside air and located at the position higher than that of the indoor heat exchanger 101. The refrigerant piping 103 connects the indoor heat exchanger and outdoor heat exchanger so that the low boiling point refrigerant (HCFC-22, HFC-23) in the system circulates through the indoor heat exchanger 101 and outdoor heat exchanger 102.

With the configuration, the low boiling point refrigerant enclosed in the refrigerant piping is heated in the indoor heat exchanger 101 by the heat of the air in the room to be boiled and evaporated. The evaporated low boiling point refrigerant gas flows upward in the refrigerant pipe 103 and cools and dehumidifies the air passing through the indoor heat exchanger 101.

The low boiling point refrigerant gas flew upward in said refrigerant piping is introduced into the outdoor heat exchanger 102 and thereby cooled by the outside air to be condensed to a liquid state. The liquefied low boiling point refrigerant flows downward in the refrigerant piping by the effect of gravity to be again returned to the indoor heat exchanger 101 to be evaporated. Thus the evaporation condensing cycle is reiterated.

When outside air temperature is lower than the air temperature in the room, the pressure in the evaporator is higher than that in the condenser, so that refrigerant-circulation occurs without enforcing power. Thus, the heat in the room can be transferred to the outside of the room without enforcing power, and the air in the room can be dehumidified. As a result, substantial energy-saving can be attained. That is, the characteristic of the proposed natural refrigerant-circulation chilling and dehumidifying apparatus is determined by the difference in specific gravity of the low boiling point refrigerant caused by the phase-change thereof, difference in height of the liquid column of the low boiling point refrigerant, refrigerant piping system, the characteristics of the indoor heat exchanger and outdoor heat exchanger.

Next, the second embodiment of the proposal will be explained with reference to FIG. 4.

As shown in FIG. 4, the second embodiment of the natural circulation chilling and dehumidifying apparatus comprises an indoor heat exchanger 101, an outdoor heat exchanger 102, a refrigerant piping 103, an expansion valve 104, and a separate forced refrigerant-circulation refrigerating apparatus (a vapor compression refrigerating apparatus).

The vapor compression refrigerating apparatus 105 comprises an evaporation heat exchanger 150, a condensing heat exchanger 151, a compressor 152, and an expansion valve 153. The evaporation heat exchanger 150 of the vapor compression refrigerating apparatus 105 is in close contact with the outdoor heat exchanger 102 in order to efficiently take away heat from the outdoor heat exchanger 102. Reference symbol A denotes a wall, the left side thereof being a room and the right side thereof being the outside.

With the above configuration, said vapor compression refrigerating apparatus 105 is operated only when the temperature difference between the inside and outside of the room becomes small and cooling ability is reduced, in order to backup the heat exchanging ability of the outdoor heat exchanger 102.

Next, the third embodiment of the proposal will be explained with reference to FIG. 5.

As shown in FIG. 5, the third embodiment of the natural refrigerant-circulation chilling and dehumidifying apparatus consists of a vapor compression refrigerating/heat pumping apparatus 106 of prior art and the natural refrigerant-circulation chilling and dehumidifying apparatus 107 shown in FIG. 3.

Said vapor compression refrigerating and heat pump apparatus 106 works on a conventional energy-consuming vapor compression refrigerating cycle and comprises an indoor heat exchanger 160, an outdoor heat exchanger 161, a compressor 162, an expansion valve 163, and a refrigerant piping 164 connecting them in a loop. Reference symbol A denotes a wall, the left side thereof being a room and the right side thereof being the outside.

The compressor 162 is for compressing the low boiling point refrigerant filled in the system. The refrigerating cycle and heat pump cycle can be switched to each other according to whether the compressed refrigerant gas is introduced to the outdoor heat exchanger 161 or to the indoor heat exchanger 160.

In above configuration, the vapor compression refrigerating/heat pumping apparatus 106 is an air conditioning apparatus provided besides the natural refrigerant-circulation chilling and dehumidifying apparatus 107. When the natural circulation of the refrigerant occurs sufficiently, energy-saving operation with the vapor compression refrigerating cycle operation stopped can be performed, or the heat pumping cycle operation of the vapor compression cycle to warm the room can be performed while dehumidifying by the operation of the natural refrigerant-circulation cycle. The two systems work independently.

When considering the case the proposal disclosed in Japanese Laid-Open Patent Application No.10-300128 is used in a cold district, the second and third embodiments can accommodate enough to the environment, however, two sets of indoor heat exchangers, outdoor heat exchangers, and refrigerant pipe lines are necessary to be provided, and there is a problem of the high cost of equipment.

Further, one of the two systems is the equipment for backing-up when outside temperature is high, so the utilization factor of the equipment is low and accordingly the investment efficiency is low.

SUMMARY OF THE INVENTION

The present invention is made in light of the problems of the prior art mentioned above, and the object is to provide a thermo-siphon chiller refrigerator for use in cold districts by joining a compressor, bypass piping, and switching valves to a natural refrigerant-circulation refrigerating system to enable the thermo-siphon chiller refrigerator to perform a vapor compression refrigerating cycle instead of a natural refrigerant-circulation cycle utilizing a part of the piping for the natural refrigerant-circulation cycle when outside temperature is high in summer.

The present invention proposes a thermo-siphon chiller refrigerator for use in cold districts comprising an outdoor heat exchanger functioning as a condenser, an indoor heat exchanger functioning as an evaporator located at a position lower than that of said outdoor heat exchanger, a compressor, and an expansion valve, characterized in that a refrigerant vapor passage connecting said indoor heat exchanger to said outdoor heat exchanger and a refrigerant liquid passage connecting said outdoor heat exchanger to said indoor heat exchanger by way of said expansion valve, these passages forming a natural circulation passage of refrigerant, are provided to allow a thermo-siphon cycle, i.e. a natural refrigerant-circulation cycle to be performed, and a forced circulation passage of refrigerant with said compressor disposed between said indoor heat exchanger and outdoor heat exchanger is formed to allow a vapor compression refrigerating cycle to be performed, whereby the thermo-siphon chiller refrigerator can accommodate to both high and low outside air temperatures.

The above invention is constituted such that, a compressor is joined to the conventional natural refrigerant-circulation refrigerating system comprising an outdoor heat exchanger functioning as a condenser, an indoor heat exchanger functioning as an evaporator and being located in a position lower than that of the outdoor heat exchanger, and refrigerant piping, and the compressor is connected to the outdoor heat exchanger and indoor heat exchanger to make it possible to perform vapor compression cycle by switching the path of refrigerant flow. When outside air temperature is higher than a predetermined temperature, the refrigerant-flow path is switched to perform a vapor compression refrigerating cycle.

It is preferable in the present invention that said indoor heat exchanger is of a flooded type evaporator, an evaporation pressure adjusting valve is provided downstream from the evaporator, and said outdoor heat exchanger is located so that the refrigerant outlet thereof is positioned higher than the liquid level of said flooded type evaporator.

The above invention defines that the indoor heat exchanger used for the thermo-siphon chiller refrigerator is a flooded type evaporator, and the evaporation pressure adjusting valve is provided downstream from the evaporator in order to accommodate to the change in outside air temperature. The outdoor heat exchanger is positioned so that the condensed refrigerant liquid level therein is higher than the liquid level in the flooded type evaporator to enable natural circulation of the refrigerant.

It is preferable that said outdoor heat exchanger is of a air-cooled type condenser provided with a cooling fan of which the rotation speed is controlled by means of an inverter.

That is, the outdoor heat exchanger used in the thermo-siphon chiller refrigerator is preferable to be an air-cooled condenser with a cooling fan of which the rotation speed can be controlled by an inverter motor in order to secure proper cooling ability of the condenser regardless of the change in outside air temperature.

In the invention, an evaporation pressure adjusting valve is provided downstream from the indoor heat exchanger to adjust evaporation pressure in accordance with the variation of outside air temperature.

It is preferable in the invention that, the natural circulation passage of refrigerant consists of a refrigerant vapor passage of larger diameter (thick pipe) and a refrigerant liquid passage of smaller diameter (thin pipe), the forced circulation passage of refrigerant consists of a refrigerant vapor passage mainly consisting of said smaller diameter passage and a refrigerant liquid passage mainly consisting of said larger diameter passage, and the passages are combined by means of bypass passages.

According to the above invention, when operated by a natural refrigerant-circulation cycle, refrigerant gas flows through the thick pipe (larger diameter passage) and refrigerant liquid flows through the thin pipe (smaller diameter passage) in order to eliminate the influence of flow resistance in the natural refrigerant-circulation, and when operated by a vapor compression cycle (forced refrigerant-circulation cycle), refrigerant gas flows mainly through the thin pipe and refrigerant liquid flows mainly through the thick pipe. Therefore, lubricating oil accompanies the refrigerant gas flowing with large velocity in the thin pipe toward the condenser when the vapor compression refrigerating cycle is performed, and the lubricating oil can be returned to the compressor to ensure smooth operation of the compressor. The passages are connected by bypass passages.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
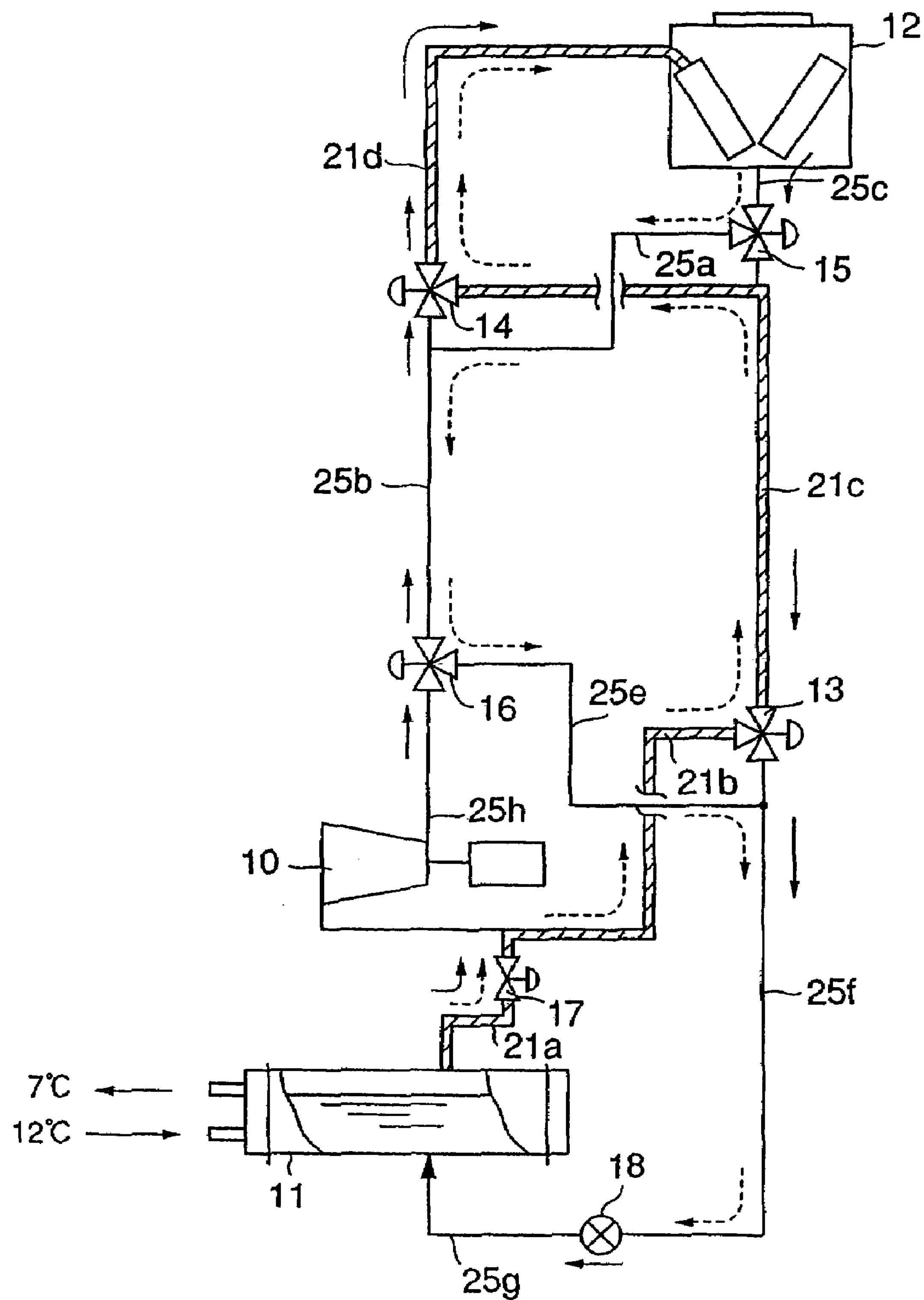
FIG. 1 is an illustration showing the schematic configuration of the thermo-siphon chiller refrigerator for use in cold districts according to the present invention.
Figure 2:
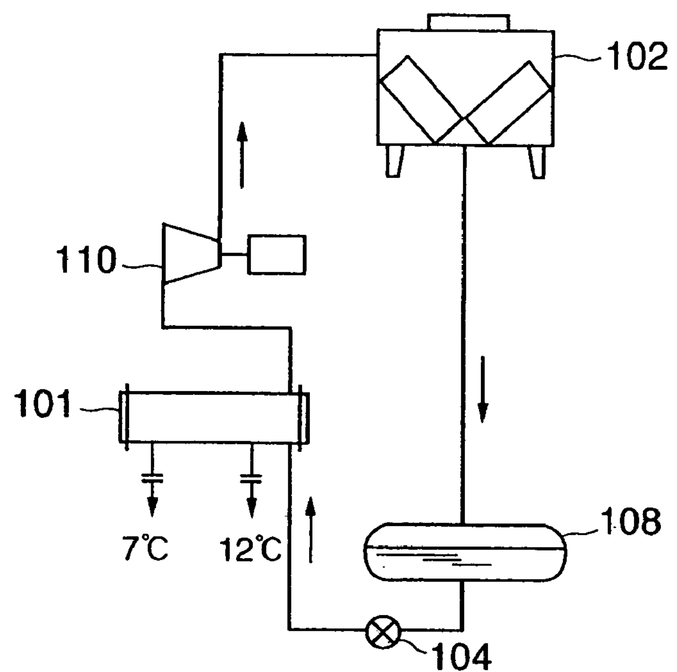
FIG. 2 is an illustration showing the schematic configuration of the conventional vapor compression refrigerating equipment.
Figure 3:
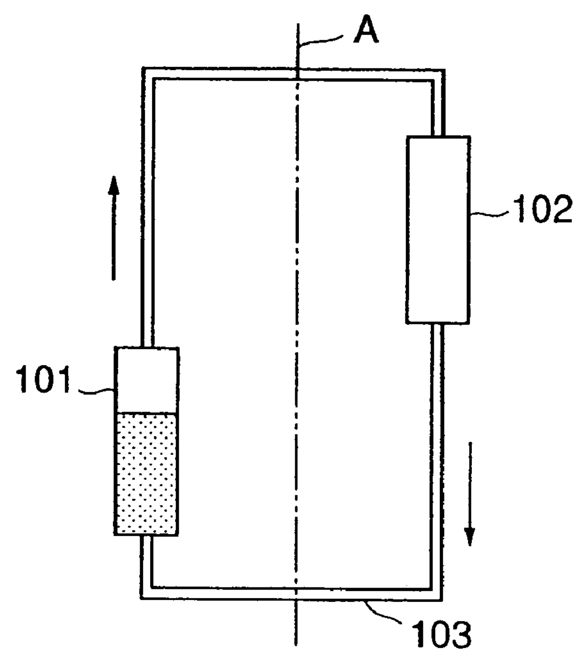
FIG. 3 is an illustration showing the first embodiment of the natural refrigerant-circulation chiller of the prior art.
Figure 4:
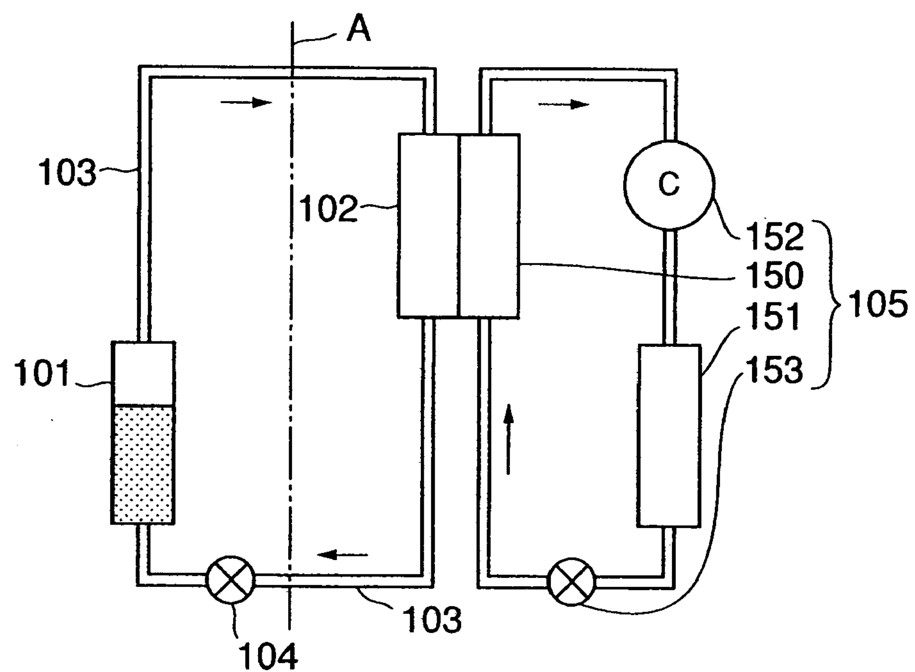
FIG. 4 is an illustration showing the second embodiment of the natural refrigerant-circulation chiller of the prior art.
Figure 5:
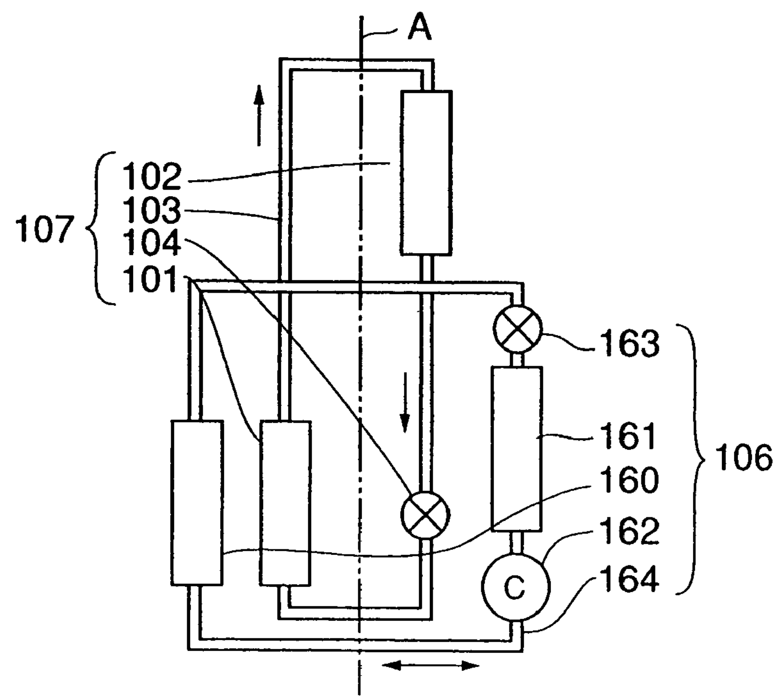
FIG. 5 is an illustration showing the third embodiment of the natural refrigerant-circulation chiller of the prior art.

FIG. 1 is an illustration showing the schematic configuration of the thermo-siphon chiller refrigerator for use in cold districts according to the present invention.

The thermo-siphon chiller refrigerator for use in cold districts of the present invention constitutes, as shown in FIG. 1, a natural refrigerant-circulation refrigerating cycle and a forced refrigerant-circulation refrigerating cycle (vapor compression refrigerating cycle), which can supply cold air of 7° C. when atmospheric temperature rises over a predetermined value in summer by the operation of the vapor compression refrigerating cycle.

The thermo-siphon chiller refrigerator consists of a compressor 10 additionally installed to a natural refrigerant-circulation refrigerating system comprising an outdoor heat exchanger 12 functioning as an air-cooled condenser, an indoor heat exchanger 11 functioning as an evaporator located at a position lower than that of the outdoor heat exchanger 12, and an expansion valve 18 and performs a vapor compression refrigerating cycle by driving said additional compressor when outside air temperature is high and the refrigerating capacity of the natural refrigerant-circulation refrigerating cycle is not sufficient.

Said natural refrigerant-circulation refrigerating cycle is made through an outdoor heat exchanger 12 which is an air-cooled condenser, an indoor heat exchanger 11 which is a flooded type evaporator located at a position lower than that of the outdoor heat exchanger 12, an expansion valve 18, a evaporation pressure adjusting valve 17, switching valves 13, 14, 15, 16, and thick pipes (pipes larger in diameter) 21*a*, 21*b*, 21*c*, 21*d* (the diagonally shaded areas in FIG. 1), and thin pipes (pipes smaller in diameter) 25*c*, 25*a*, 25*b*, 25*e*, 25*f*, 25*g* (the solid lines in FIG. 1), the refrigerant flowing in the direction shown by arrows with broken line. Cold air of 7° C. cooled in the indoor heat exchanger by the evaporation therein of the refrigerant is supplied to the room.

The liquid refrigerant condensed in the outdoor heat exchanger 12 by the cooling by outside air flows down to the indoor heat exchanger 11 by gravitation through the thin pipes 25*c*, 25*b*, 25*b*, 25*e*, 25*f*, and 25*g*, and the refrigerant vapor produced by evaporation in the indoor heat exchanger 11 flows up to the outdoor heat exchanger 12 through the thick pipes 21*a*, 21*b*, 21*c*, 21*d* overcoming the flow resistance in the pipes by the pressure difference between the evaporator side pressure and condenser side pressure, thus the refrigerant-circulates naturally.

The evaporation pressure adjusting valve 17 is located downstream from the indoor heat exchanger 11, the valve being controlled to adjust the pressure in the evaporator in accordance with the change in outside air temperature. The condensing capacity of the air-cooled condenser is properly secured regardless of outside air temperature through controlling the rotation speed of the cooling fan of the condenser by an inverter motor.

Said natural refrigerant-circulation refrigerating cycle is switched to said vapor compression refrigerating cycle when the refrigeration by the natural refrigerant-circulation refrigerating cycle is deficient because of high outside air temperature in summer. The vapor compression refrigerating cycle is made through the additional compressor 10, outdoor heat exchanger 12, expansion valve 18, indoor heat exchanger 11, switching valves 16, 14, 15, 13, thin pipes 25*h*, 25*b*, thick pipes 21*d*, thin pipe 25*c*, thick pipe 21*c*, and thin pipes 25*f*, 25*g*, the refrigerant flowing in the direction indicated by arrows with solid line. Cold air of 7° C. cooled in the indoor heat exchanger by the evaporation therein of the refrigerant is supplied to the room.

In the operation of vapor compression refrigerating cycle, the refrigerant gas produced by the evaporation of the refrigerant in the indoor heat exchanger 11 is compressed by the compressor 10 to high-pressure, high-temperature refrigerant gas to be fed under pressure from the compressor 10 to the outdoor heat exchanger 12 through the thin pipe 25*h*, switching valve 16, thin pipe 25*b*, switching valve 14, and thick pipe 21*d*, and condensed in the air-cooled condenser.

The condensed liquid refrigerant flows to the indoor heat exchanger 11 which is a flooded type evaporator through the thin pipe 25*c*, switching valve 15, thick pipe 21*c*, switching valve 13, thin pipe 25*f*, expansion valve 18, and thin pipe 25*g* to be evaporated there to cool the room air to 7° C.

When using said compressor 10, only the thin pipe 25*h* is necessary to be added to the natural refrigerant-circulation piping. The feeding of the refrigerant gas under pressure from the compressor 10 to the outdoor heat exchanger 12 is done by way of the thin pipe 25*h*, switching valve 16, thin pipe 25*b*, switching valve 14, and thick pipe 21*d*. Lubrication oil accompanies the refrigerant gas flowing with large velocity in the thin pipe toward the air-cooled condenser, then the oil flows down together with the liquid refrigerant to the evaporator by gravitation owing to the head drop from the condenser to the evaporator.

EFFECTS OF THE INVENTION

The present invention provides an energy-saving and low-cost thermo-siphon chiller refrigerator for use in cold districts by joining a compressor, bypass piping, and switching valves to a natural refrigerant-circulation refrigerating system to enable the thermo-siphon chiller refrigerator to perform a vapor compression refrigerating cycle instead of a natural refrigerant-circulation cycle, utilizing a part of the piping for the natural refrigerant-circulation cycle, when outside temperature is high in summer.

What is claimed is:

1. A thermo-siphon chiller refrigerator for use in cold districts comprising an outdoor heat exchanger functioning as a condenser, an indoor heat exchanger functioning as an evaporator located at a position lower than that of said outdoor heat exchanger, a compressor, and an expansion valve, wherein a refrigerant vapor passage connecting said indoor heat exchanger to said outdoor heat exchanger and a refrigerant liquid passage connecting said outdoor heat exchanger to said indoor heat exchanger by way of said expansion valve, these passages forming a natural circulation passage of refrigerant, are provided to allow a thermo-siphon cycle or natural refrigerant-circulation cycle to be performed, a forced circulation passage of refrigerant with said compressor disposed between said indoor heat exchanger and outdoor heat exchanger is formed to allow a vapor compression refrigerating cycle to be performed, whereby the thermo-siphon chiller refrigerator can accommodate to both high and low outside air temperatures; and said indoor heat exchanger is of a flooded type evaporator, an evaporation pressure adjusting valve is provided downstream from the evaporator, and said outdoor heat exchanger is located so that the refrigerant outlet thereof is positioned higher than the liquid level of said flooded type evaporator.

2. The thermo-siphon chiller refrigerator for use in cold districts according to claim 1, wherein said outdoor heat exchanger is of a air-cooled type condenser provided with a rotating cooling fan, the rotation speed of which is controlled by means of an inverter.

3. The thermo-siphon chiller refrigerator for use in cold districts according to claim 1, wherein said evaporation pressure adjusting valve adjusts evaporation pressure in accordance with the variation of the atmospheric temperature.

4. The thermo-siphon chiller refrigerator for use in cold districts according to claim 1, wherein said natural circulation passage of refrigerant consists of a refrigerant vapor passage of larger diameter and a refrigerant liquid passage of smaller diameter, said forced circulation passage of refrigerant consists of a refrigerant vapor passage mainly consisting of said smaller diameter passage and a refrigerant liquid passage mainly consisting of said larger diameter passage, and the passages are combined by means of bypass passages.

* * * * *